(12) United States Patent
Kan

(10) Patent No.: US 11,809,293 B2
(45) Date of Patent: *Nov. 7, 2023

(54) STORAGE NODE FAILURE DETECTION BASED ON REGISTER VALUES FOR AN ALL FLASH ARRAY SERVER

(71) Applicant: Silicon Motion, Inc., Hsinchu County (TW)

(72) Inventor: Li-Sheng Kan, Hsinchu County (TW)

(73) Assignee: Silicon Motion, Inc., Hsinchu County (TW)

(*) Notice: Subject to any disclaimer, the term of this patent is extended or adjusted under 35 U.S.C. 154(b) by 184 days.

This patent is subject to a terminal disclaimer.

(21) Appl. No.: 17/534,386

(22) Filed: Nov. 23, 2021

(65) Prior Publication Data

US 2022/0083438 A1 Mar. 17, 2022

Related U.S. Application Data

(63) Continuation of application No. 17/156,613, filed on Jan. 24, 2021, now Pat. No. 11,216,348.

(Continued)

(51) Int. Cl.
  *G06F 11/20* (2006.01)
  *G06F 11/07* (2006.01)

(52) U.S. Cl.
  CPC ...... *G06F 11/2092* (2013.01); *G06F 11/0763* (2013.01); *G06F 11/2023* (2013.01)

(58) Field of Classification Search
  CPC ............. G06F 11/0763; G06F 11/2069; G06F 11/2079; G06F 11/2089; G06F 11/2092;

(Continued)

(56) References Cited

U.S. PATENT DOCUMENTS

| 10,372,354 B1 | 8/2019 | Parvathareddy |
| 2015/0052385 A1 | 2/2015 | Galbraith |

(Continued)

FOREIGN PATENT DOCUMENTS

| CN | 110806839 A | 2/2020 |
| CN | 110851073 A | 2/2020 |

OTHER PUBLICATIONS

Kazmi, "Non-Transparent Bridging Makes PCI-Express HA Friendly", EE Times, posted on Aug. 14, 2003, retrieved from the Internet URL: https://www.eetimes.com/non-transparent-bridging-makes-pci-express-ha-friendly/ ,Aug. 14, 2003.

*Primary Examiner* — Bryce P Bonzo
*Assistant Examiner* — Albert Li
(74) *Attorney, Agent, or Firm* — Winston Hsu

(57) ABSTRACT

The present invention provides a control method of a server, wherein the control method includes the steps of: periodically controlling a first register and a second register of a first node to have a first value and a second value, respectively; periodically controlling a third register and a fourth register of a second node to have a third value and a fourth value, respectively; controlling the first register and the fourth register to synchronize with each other, wherein the first value is different from the fourth value; controlling the second register and the third register to synchronize with each other, wherein the second value is different from the third value; and periodically checking if the third register has the third value and the fourth register has the fourth value to determine if the first node fails to work.

12 Claims, 9 Drawing Sheets

Related U.S. Application Data

(60) Provisional application No. 62/983,762, filed on Mar. 2, 2020.

(58) Field of Classification Search
CPC .... G06F 3/0614; G06F 3/0617; G06F 3/0653; G06F 3/067
See application file for complete search history.

(56) References Cited

U.S. PATENT DOCUMENTS

| | | |
|---|---|---|
| 2015/0199294 A1* | 7/2015 | Davis ................. G06F 13/4221 710/313 |
| 2016/0127467 A1 | 5/2016 | Mu |
| 2016/0283426 A1 | 9/2016 | Yang |
| 2019/0146889 A1 | 5/2019 | Cannata |
| 2019/0294569 A1* | 9/2019 | Moolanmoozha .. G06F 13/1684 |

\* cited by examiner

STORAGE NODE FAILURE DETECTION BASED ON REGISTER VALUES FOR AN ALL FLASH ARRAY SERVER

CROSS REFERENCE TO RELATED APPLICATIONS

This is a continuation of the co-pending U.S. application Ser. No. 17/156,613 (filed on Jan. 24, 2021), which claims the priority of U.S. Provisional Application No. 62/983,762 (filed Mar. 2, 2020), which is included herein by reference in its entirety.

BACKGROUND OF THE INVENTION

1. Field of the Invention

The present invention is related to memory control, and more particularly, to a method for performing data access management of an all flash array (AFA) server, and associated apparatus such as the AFA server, a control circuit thereof, etc.

2. Description of the Prior Art

A data storage server may be arranged to store user data of one or more users, and various control methods regarding the data storage server have been proposed in the related art in order to bring good user experience to the users. As non-volatile (NV) memories such as Flash memories have been widely applied to various data storage device such as solid state drives (SSDs), etc., it is proposed in the related art to implement the data storage server to be a non-volatile (NV) memory type data storage server using NV memories as storage media thereof, such as an AFA server having multiple SSDs installed therein. However, some problems may occur. For example, the management of accessing the Flash memory in any SSD of the multiple SSDs is complicated. To ensure that the access control of the Flash memory in this SSD conforms to associated specifications, the controller of the Flash memory in this SSD is usually equipped with some management mechanisms to properly manage the internal operations thereof. Although SSD manufactures may have tried to make SSDs seem to be a good solution for replacing hard disk drives (HDDs), some characteristics of the SSDs are quite different from that of the HDDs. As a result, the control methods mentioned above may become improper or invalid, causing the overall performance of the AFA server to be degraded. Thus, a novel method and associated architecture are needed for solving the problems without introducing any side effect or in a way that is less likely to introduce a side effect.

SUMMARY OF THE INVENTION

It is therefore an objective of the present invention to provide a control method of a server, to solve the above-mentioned problems.

According to one embodiment of the present invention, a server comprising SSD, a first node and a second node is disclosed. The first node comprises a first memory, a first processor and a first communication circuit, wherein the first memory comprises a first register and a second register, the first processor is configured to control the first register and the second register to have a first value and a second value, respectively. The second node comprises a second memory, a second processor and a second communication circuit, wherein the second memory comprises a third register and a fourth register, the second processor is configured to control the third register and the fourth register to have a third value and a fourth value, respectively, and the second communication circuit is coupled to the second processor, the second memory and the first communication circuit. The first register and the fourth register are synchronized with each other, the second register and the third register are synchronized with each other, the first value controlled by the first processor is different from the fourth value controlled by the second processor, and the second value controlled by the first processor is different from the third value controlled by the second processor; and the second processor periodically checks if the third register has the third value and the fourth register has the fourth value to determine if the first node fails to work.

According to another embodiment of the present invention, a control method of a server comprises the steps of: setting a first node within the server as a master device; periodically controlling a first register and a second register of the first node to have a first value and a second value, respectively; setting a second node within the server as a slave device; periodically controlling a third register and a fourth register of the second node to have a third value and a fourth value, respectively; controlling the first register and the fourth register to synchronize with each other, wherein the first value controlled by the first node is different from the fourth value controlled by the second node; controlling the second register and the third register to synchronize with each other, wherein the second value controlled by the first node is different from the third value controlled by the second node; and periodically checking if the third register has the third value and the fourth register has the fourth value to determine if the first node fails to work.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
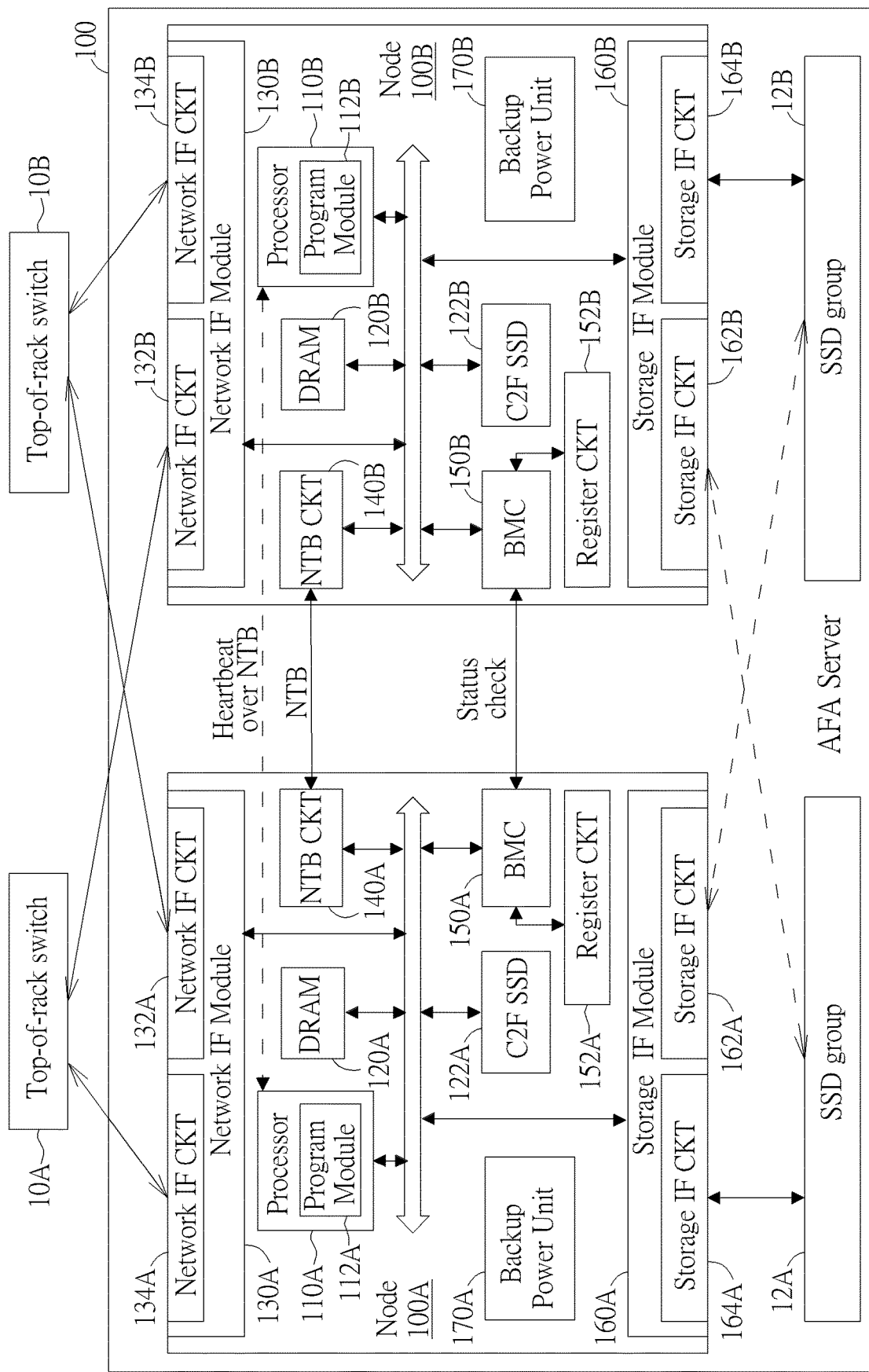
FIG. 1 is a diagram of an all flash array (AFA) server according to an embodiment of the present invention.

FIG. 1 is a diagram of an all flash array (AFA) server 100 according to an embodiment of the present invention. The AFA server 100 may comprise multiple nodes such as two nodes 100A and 100B, where any of the multiple nodes (e.g. one of the nodes 100A and 100B) may have the same or similar architecture as that of another of the multiple nodes (e.g. another of the nodes 100A and 100B). For example, the node 100A may comprise at least one processor (e.g. one or more processors such as one or more Central Processing Units (CPUs)) that may be collectively referred to as the processor 110A, and comprise a Dynamic Random Access Memory (DRAM) 120A, a Copy-to-Flash (C2F) SSD 122A, a network interface (IF) module 130A comprising one or more network interface circuits such as network interface circuits 132A and 134A (respectively labeled "Network IF CKT" for brevity), a Non-Transparent Bridge (NTB) module (or NTB) such as a NTB communications circuit 140A (labeled "NTB CKT" for brevity), a Board Management Controller (BMC) 150A, a register circuit 152A (labeled "Register CKT" for brevity) that is coupled to the BMC 150A, a storage interface (IF) module 160A comprising one or more storage interface circuits such as storage interface circuits 162A and 164A (respectively labeled "Storage IF CKT" for brevity), and a backup power source such as a backup power unit 170A (e.g. a battery), where at least one portion (e.g. a portion or all) of these components may be coupled to each other through a bus of the node 100A, but the present invention is not limited thereto. According to some embodiments, the architecture of the node 100A may vary.

Similarly, the node 100B may comprise at least one processor (e.g. one or more processors such as one or more CPUs) that may be collectively referred to as the processor 110B, and comprise a DRAM 120B, a C2F SSD 122B, a network interface (IF) module 130B comprising one or more network interface circuits such as network interface circuits 132B and 134B (respectively labeled "Network IF CKT" for brevity), a NTB module (or NTB) such as a NTB communications circuit 140B (labeled "NTB CKT" for brevity), a BMC 150B, a register circuit 152B (labeled "Register CKT" for brevity) that is coupled to the BMC 150B, a storage interface (IF) module 160B comprising one or more storage interface circuits such as storage interface circuits 162B and 164B (respectively labeled "Storage IF CKT" for brevity), and a backup power source such as a backup power unit 170B (e.g. a battery), where at least one portion (e.g. a portion or all) of these components may be coupled to each other through a bus of the node 100B, but the present invention is not limited thereto. According to some embodiments, the architecture of the node 100B may vary.

As shown in FIG. 1, the AFA server 100 may further comprise multiple SSDs coupled to the nodes 100A and 100B, such as the SSD groups 12A and 12B. The SSD groups 12A and 12B may be coupled to the nodes 100A and 100B, and may be respectively linked to the nodes 100A and 100B by default, where the dashed lines between the nodes 100A and 100B and the SSD groups 12B and 12A may indicate optional links. For example, the node 100A may utilize the storage interface module 160A to activate the link between the storage interface circuits 164A and the SSD group 12A, for accessing data in the SSD group 12A, and the node 100B may utilize the storage interface module 160B to activate the link between the storage interface circuits 164B and the SSD group 12B, for accessing data in the SSD group 12B. When there is a need, the linking relationships between the nodes 100A and 100B and the SSD groups 12A and 12B may vary. For example, the node 100A may utilize the storage interface module 160A to activate the link between the storage interface circuits 162A and the SSD group 12B, for accessing data in the SSD group 12B, and the node 100B may utilize the storage interface module 160B to activate the link between the storage interface circuits 162B and the SSD group 12A, for accessing data in the SSD group 12A.

The processor 110A running program modules 112A can be configured to control operations of the node 100A. The DRAM 120A can be configured to buffer data (e.g. data to be written into the SSD group 12A), and the C2F SSD 122A can be configured to copy buffered data in the DRAM 120A to a Flash memory within the C2F SSD 122A, to prevent data loss of the buffered data when there is a need. For example, the C2F SSD 122A can be implemented by way of an expansion card mounted on a main circuit board (e.g. main board or motherboard) within the node 100A, such as an M.2 module (e.g. a circuit board having a connector conforming to M.2 specification), where the C2F SSD 122A may comprise a memory controller, one or more Flash memory chips, etc., but the present invention is not limited thereto. In addition, the network interface module 130A comprising the network interface circuits 132A and 134A can be configured to couple the node 100A (e.g. the processor 110A, the DRAM 120A, etc. on the main circuit board therein) to at least one network (e.g. Local Area Network (LAN), Wide Area Network (WAN), Internet, etc.) through at least one network switch such as top-of-rack (TOR) switches 10A and 10B. Additionally, the storage interface module 160A comprising the storage interface circuits 162A and 164A can be configured to couple the node 100A (e.g. the processor 110A, the DRAM 120A, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide a storage service to users through the node 100A.

Similarly, the processor 110B running program modules 112B can be configured to control operations of the node 100B. The DRAM 120B can be configured to buffer data (e.g. data to be written into the SSD group 12B), and the C2F SSD 122B can be configured to copy buffered data in the DRAM 120B to a Flash memory within the C2F SSD 122B, to prevent data loss of the buffered data when there is a need. For example, the C2F SSD 122B can be implemented by way of an expansion card mounted on a main circuit board (e.g. main board or motherboard) within the node 100B, such as an M.2 module (e.g. a circuit board having a connector conforming to M.2 specification), where the C2F SSD 122B may comprise a memory controller, one or more Flash memory chips, etc., but the present invention is not limited thereto. In addition, the network interface module 130B comprising the network interface circuits 132B and 134B can be configured to couple the node 100B (e.g. the processor 110B, the DRAM 120B, etc. on the main circuit board therein) to at least one network (e.g. LAN, WAN, Internet, etc.) through at least one network switch such as the top-of-rack (TOR) switches 10A and 10B. Additionally, the storage interface module 160B comprising the storage interface circuits 162B and 164B can be configured to couple the node 100B (e.g. the processor 110B, the DRAM 120B, etc.

on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide the storage service to the users through the node 100B.

Regarding communications between the node 100A and its peer node such as the node 100B, the NTB module such as the NTB communications circuit 140A can be configured to communicate with a corresponding NTB module such as the NTB communications circuit 140B through a NTB path (labeled "NTB" for brevity) between the nodes 100A and 100B, to synchronize data and storage statuses of the nodes 100A and 100B and make them identical. Similarly, regarding communications between the node 100B and its peer node such as the node 100A, the NTB module such as the NTB communications circuit 140B can be configured to communicate with a corresponding NTB module such as the NTB communications circuit 140A through the NTB path between the nodes 100A and 100B, to synchronize data and storage statuses of the nodes 100A and 100B and make them identical. More particularly, the NTB modules such as the NTB communications circuit 140A and 140B can provide a function of a transport bridge between the nodes 100A and 100B and separate respective addresses domains of the nodes 100A and 100B, for facilitating communications between the nodes 100A and 100B without any address confliction. For example, the respective buses of the nodes 100A and 100B may conform to Peripheral Component Interconnect Express (PCIe) specification, and the NTB module of each node of the nodes 100A and 100B may be regarded as an endpoint of the node, where the nodes 100A and 100B may communicate and share devices with each other through the transport bridge, but the present invention is not limited thereto. According to some embodiments, the NTB modules such as the NTB communications circuit 140A and 140B can be implemented by way of a customized network interface circuit, for controlling the nodes 100A and 100B to communicate with each other as if they are communicating through network interface circuits.

Under control of the processor 110A running program modules 112A and the processor 110B running program modules 112B, the nodes 100A and 100B can maintain and monitor heartbeats over the NTB to determine peer node availability, for performing high availability (HA) control. For example, the node 100B can be configured to send a heartbeat signal to the node 100A, and the node 100A can be configured to detect and monitor the heartbeat signal from the node 100B to determine the availability of the node 100B, where whether the heartbeat signal from the node 100B exists may indicate whether the node 100B is available (or healthy). For another example, the node 100A can be configured to send a heartbeat signal to the node 100B, and the node 100B can be configured to detect and monitor the heartbeat signal from the node 100A to determine the availability of the node 100A, where whether the heartbeat signal from the node 100A exists may indicate whether the node 100A is available (or healthy). Based on the architecture shown in FIG. 1, when one of the nodes 100A and 100B is unavailable, the other of the nodes 100A and 100B can continue provide the storage service of the AFA server 100 for the users.

Please note that the AFA server 100 is equipped with more than one inter-node communications path. In addition to the NTB path, the AFA server 100 can be configured to have one or more additional communications paths such as a BMC path between the BMCs 150A and 150B, where the BMC 150A can be configured to manage at least one portion (e.g. a portion or all) of the hardware layer of the node 100A, and the BMC 150B can be configured to manage at least one portion (e.g. a portion or all) of the hardware layer of the node 100B. Regarding communications between the node 100A and its peer node such as the node 100B, the BMC 150A can be configured to communicate with the BMC 150B through the BMC path to access (e.g. read or write) one or more register values of one or more registers in the register circuit 152B, for performing status check, etc. on the node 100B. Similarly, regarding communications between the node 100B and its peer node such as the node 100A, the BMC 150B can be configured to communicate with the BMC 150A through the BMC path to access (e.g. read or write) one or more register values of one or more registers in the register circuit 152A, for performing status check, etc. on the node 100A. More particularly, the BMCs 150A and 150B can manage the respective hardware layer of the nodes 100A and 100B independently, having no need to rely on the processors 110A and 110B. For example, the BMC 150A can take care of unfinished works of the node 100A when the processor 110A malfunctions, and the BMC 150B can take care of unfinished works of the node 100B when the processor 110B malfunctions, but the present invention is not limited thereto. According to some embodiments, the BMCs 150A and 150B can be configured to take over the nodes 100A and 100B, respectively, to perform emergency processing to reduce the probability of data loss.

According to this embodiment, the AFA server 100 can be configured to be powered by multiple types of power sources. Each node of the nodes 100A and 100B may comprise at least one main power source (e.g. at least one power supply), for providing power to other components of the node in a normal power condition of the main power source. For example, the main power source of the node 100A can provide power to the main circuit board of the node 100A, and the main power source of the node 100B can provide power to the main circuit board of the node 100B. When an abnormal power condition of one or more nodes (e.g. the node 100A and/or the node 100B) is detected, one or more associated backup power sources (e.g. the backup power unit 170A and/or the backup power unit 170B) in the AFA server 100 can be configured to provide backup power. For example, the backup power unit 170A can provide power to the main circuit board of the node 100A (e.g. the processor 110A, the DRAM 120A, the C2F SSD 122A, the NTB communications circuit 140A, the BMC 150A, the register circuit 152A, etc.) when power failure of the main power source of the node 100A occurs, and the backup power unit 170B can provide power to the main circuit board of the node 100B (e.g. the processor 110B, the DRAM 120B, the C2F SSD 122B, the NTB communications circuit 140B, the BMC 150B, the register circuit 152B, etc.) when power failure of the main power source of the node 100B occurs.

According to some embodiments, each node of the nodes 100A and 100B (e.g. each of the respective main circuit boards of the nodes 100A and 100B) may further comprise sensors/detectors configured to perform detection on at least the components of the node to generate detection results (e.g. status obtained from any of the sensors/detectors). For example, a power detection result of the detection results may represent the power status of the main power source of the node, and more particularly, may indicate whether the abnormal power condition of the node occurs, for triggering the node to activate the backup power source (e.g. the backup power unit 170A or the backup power unit 170B) to provide the backup power.

Figure 2:
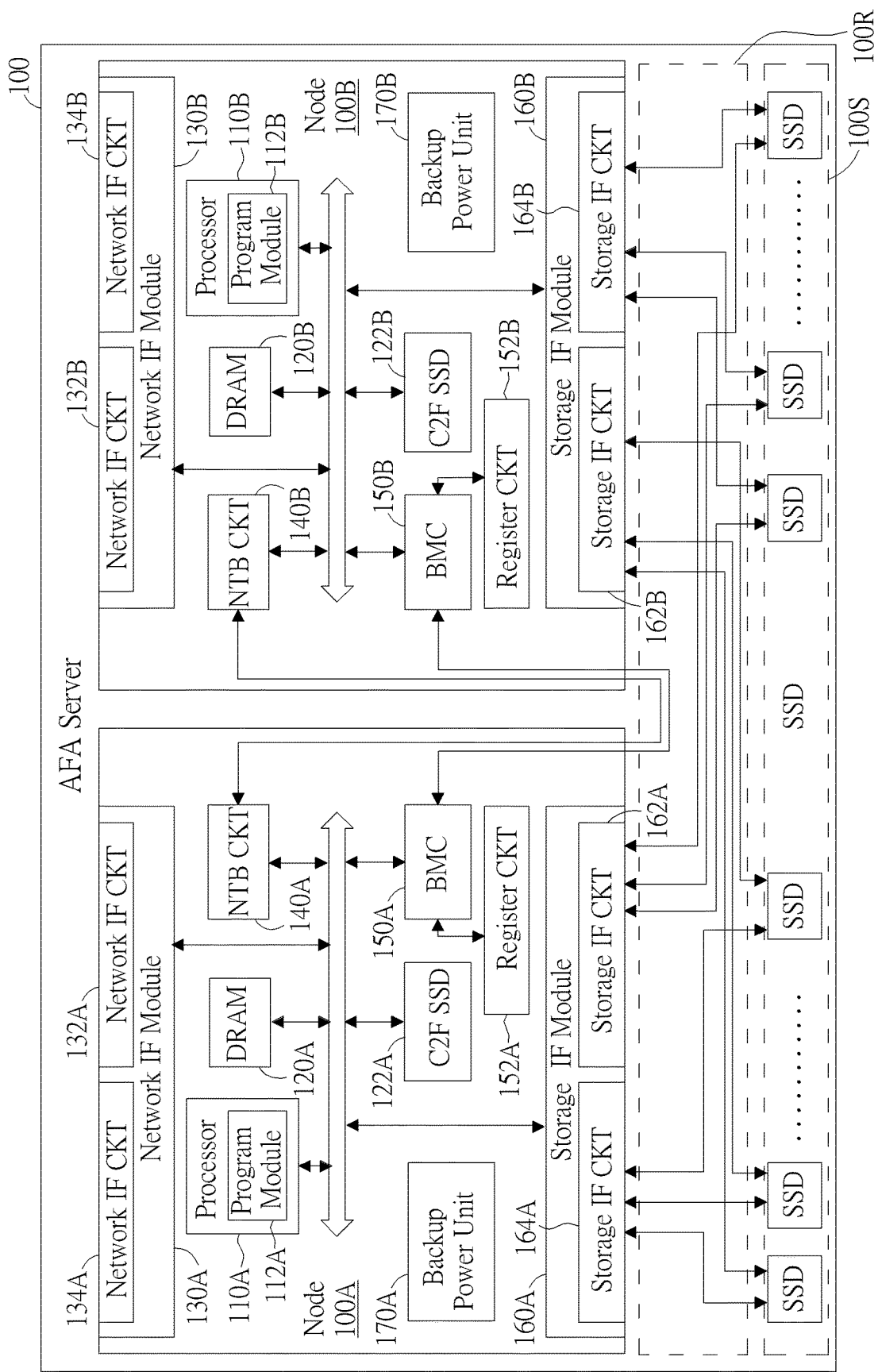
FIG. 2 illustrates some implementation details of the AFA server shown in FIG. 1 according to an embodiment of the present invention.

FIG. 2 illustrates some implementation details of the AFA server 100 shown in FIG. 1 according to an embodiment of the present invention, where the SSDs 100S can be taken as an example of the multiple SSDs mentioned in the embodiment shown in FIG. 1. In addition to the nodes 100A and 100B and the SSDs 100S, the AFA server 100 may further comprise a backplane circuit 100R. The backplane circuit 100R can be configured to electrically connect the SSDs 100S such as the SSD groups 12A and 12B to the nodes 100A and 100B. For example, the backplane circuit 100R can be implemented by way of a backplane circuit board having associated connectors, etc. In addition, a partial path of the NTB path between the NTB communications circuits 140A and 140B and a partial path of the BMC path between the BMCs 150A and 150B can be implemented within the backplane circuit 100R. As each of the NTB path and the BMC path does not pass through any cable which may be easily damaged, the communications paths between the nodes 100A and 100B are robust, and therefore, the nodes 100A and 100B can maintain effective communications and associated control to guarantee overall performance of the AFA server 100.

According to some embodiments, each of the SSDs 100S can be a single port SSD, and more particularly, can be a single port device based SSD. In addition, with aid of the backplane circuit 100R, the AFA server 100 can support hot-plug of any of the SSDs 100S.

According to some embodiments, one of the two nodes 100A and 100B may play a role of an active node in a high availability (HA) architecture of the AFA server 100, and another of the two nodes 100A and 100B may play a role of a standby node in the HA architecture of the AFA server 100. The two nodes 100A and 100B such as the active node and the standby node may interact with each other, and more particularly, may exchange node information through at least two communications paths such as the NTB path between the NTB communications circuits 140A and 140B and the BMC path between the BMCs 150A and 150B, and may synchronize data through the NTB path, but the present invention is not limited thereto. According to some embodiments, the AFA server 100 can be equipped with more than two inter-node communications paths.

Figure 3:
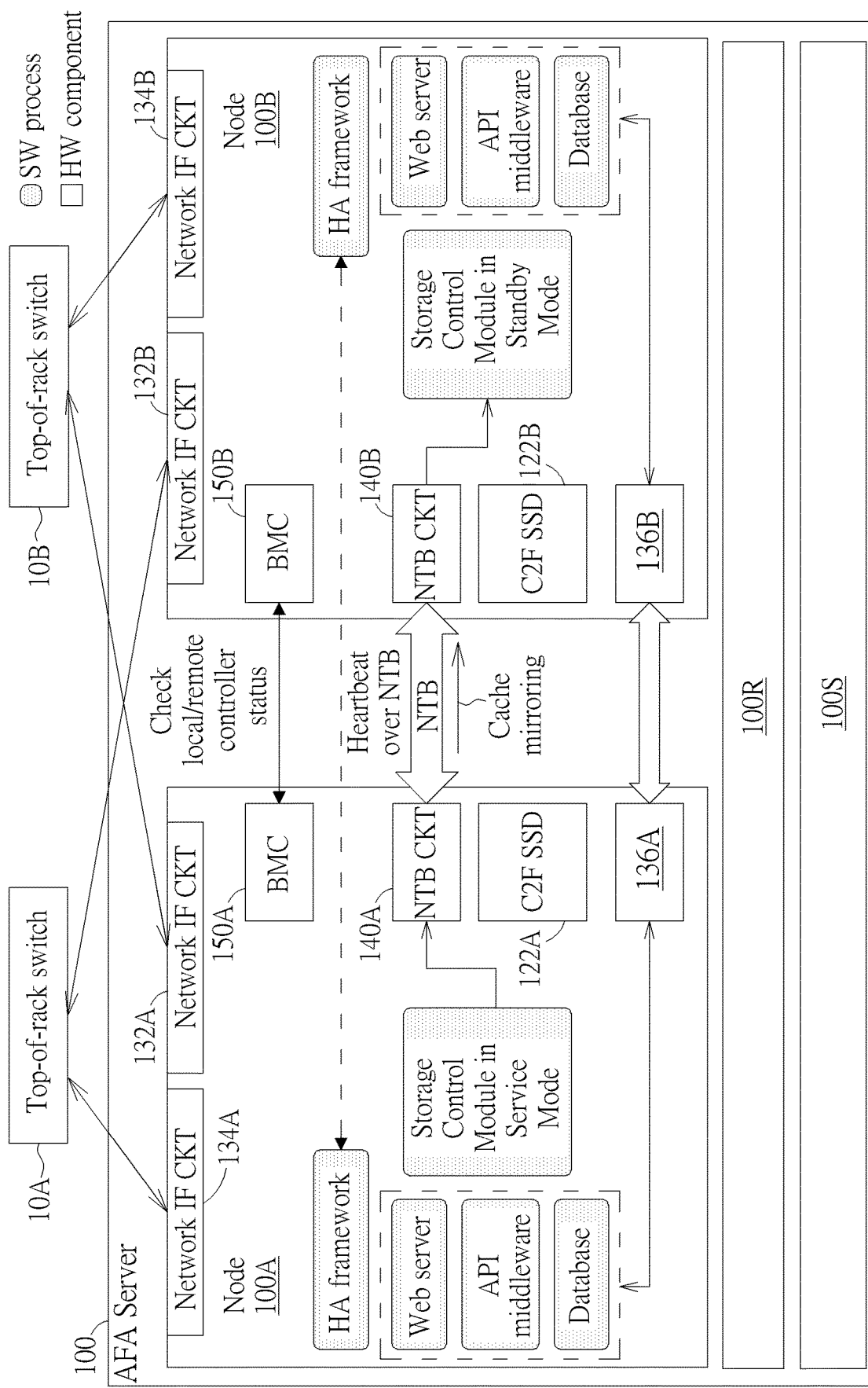
FIG. 3 illustrates a dual node architecture of the AFA server shown in FIG. 1 according to an embodiment of the present invention.

FIG. 3 illustrates a dual node architecture of the AFA server 100 shown in FIG. 1 according to an embodiment of the present invention. According to this embodiment, the nodes 100A and 100B can be configured to play the role of the active node and the role of the standby node, respectively, but the present invention is not limited thereto. For example, the nodes 100A and 100B can exchange their roles when there is a need. As shown in FIG. 3, in addition to some hardware (HW) components such as a portion of the components in the architecture shown in FIG. 1 or FIG. 2, some software (SW) processes such as HA framework processes, Web server processes, Database processes, a Storage Control Module process operating in a Service Mode and a Storage Control Module process operating in a Standby Mode (respectively labeled "HA framework", "Web server", "Database", "Storage Control Module in Service Mode" and "Storage Control Module in Standby Mode" for brevity) may be illustrated to indicate the associated interactions in the AFA server 100. The names of the processes described above indicate the associated functions thereof, respectively.

The software processes running on the node 100A (e.g. the HA framework process, the Web server process, the Database process, and the Storage Control Module process operating in the Service Mode) can be taken as examples of the program modules 112A, and the software processes running on the node 100B (e.g. the HA framework process, the Web server process, the Database process, and the Storage Control Module process operating in the Standby Mode) can be taken as examples of the program modules 112B, but the present invention is not limited thereto. In addition, the one or more network interface circuits of the network interface module 130A may further comprise a network interface circuit 136A, and the one or more network interface circuits of the network interface module 130B may further comprise a network interface circuit 136B. Thus, the AFA server 100 can be equipped with at least three inter-node communications paths such as the NTB path, the BMC path, and the network path between the network interface circuits 136A and 136B. For example, the nodes 100A and 100B can be configured to perform cache mirroring through the NTB path, check local/remote controller statuses through the BMC path, and perform additional communications operations through the network path between the network interface circuits 136A and 136B.

Figure 4:
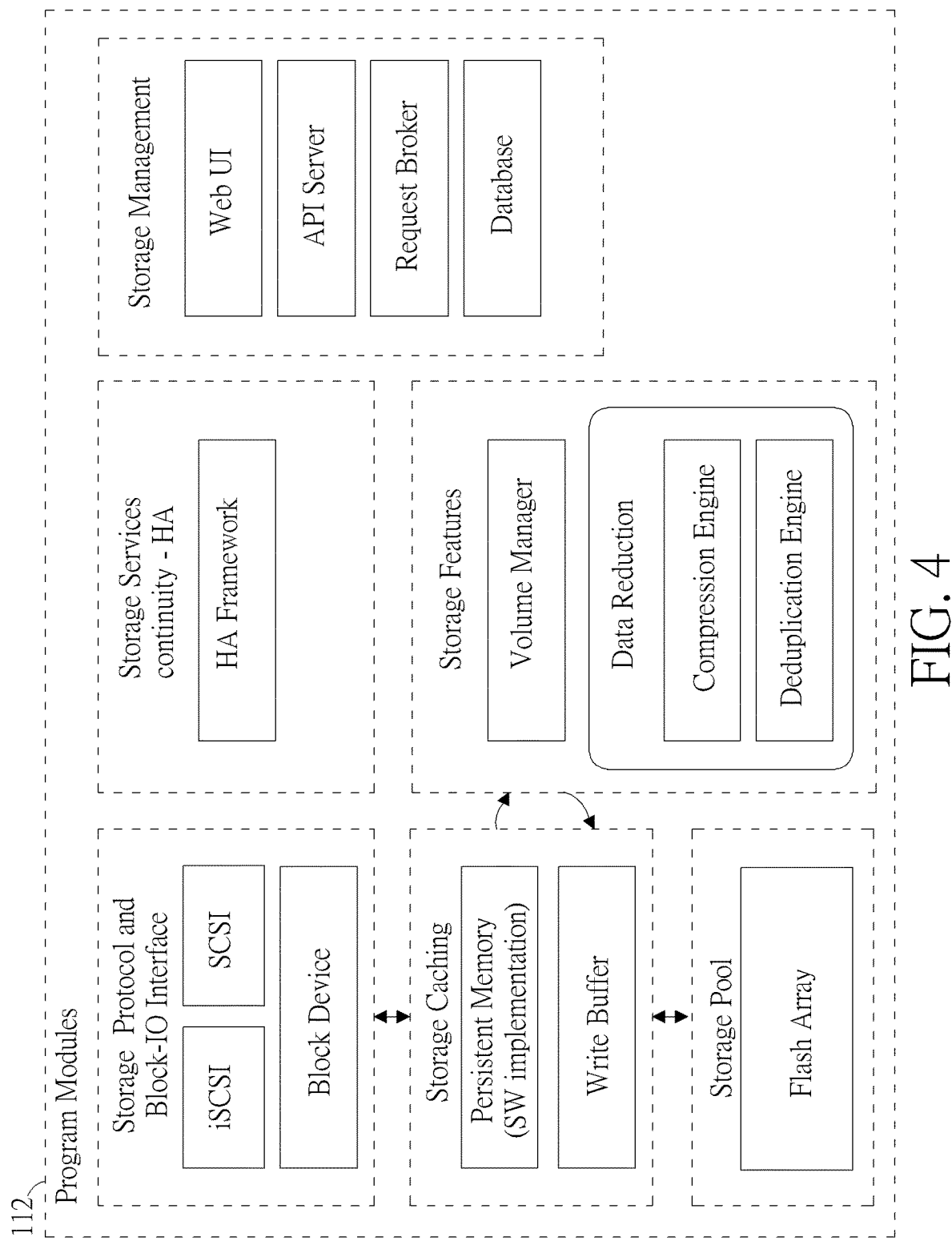
FIG. 4 illustrates some program modules in any of the nodes shown in FIG. 1 according to an embodiment of the present invention.

FIG. 4 illustrates some program modules 112 in any (e.g. each) of the nodes 100A and 100B shown in FIG. 1 according to an embodiment of the present invention. For example, the program modules 112 may represent the program modules 112A running on the processor 110A of the node 100A or the program modules 112B running on the processor 110B of the node 100B. As shown in FIG. 4, the program modules 112 may comprise some primary program modules such as a Storage Protocol and Block-Input/Output (IO) Interface module, a Storage Caching module, a Storage Pool module, a Storage Services continuity—HA module, a Storage Features module and a Storage Management module (respectively labeled "Storage Protocol and Block-IO Interface", "Storage Caching", "Storage Pool", "Storage Services continuity—HA", "Storage Features" and "Storage Management" for brevity), where any of the primary program modules may comprise one or more sub-modules. In addition, the arrows between some of the program modules 112 indicate that they can interact with each other among multiple layers of program modules. For example, the Storage Protocol and Block-IO Interface module can be regarded as an upper layer (e.g. an upper layer program module) above the Storage Caching module, the Storage Pool module can be regarded as a lower layer (e.g. a lower layer program module) below the Storage Caching module, and the Storage Features module and the Storage Caching module can be arranged in an intermediate layer to be intermediate layer program modules, where the Storage Protocol and Block-IO Interface module and the Storage Pool module can be configured to interact with the client device and the SSD group, but the present invention is not limited thereto. When there is a need, the node can trigger other program modules to interact with one or more of these program modules.

The Storage Protocol and Block-IO Interface module may comprise some sub-modules such as a Small Computer System Interface (SCSI) module, an Internet SCSI (iSCSI) module and a Block Device module (respectively labeled "SCSI", "iSCSI" and "Block Device" for brevity). The Storage Caching module may comprise some sub-modules such as a Persistent Memory using SW implementation module and a Write Buffer module (respectively labeled "Persistent Memory (SW implementation)" and "Write Buffer" for brevity). The Storage Pool module may comprise a sub-module such as a Flash Array module (labeled "Flash Array for brevity). The Storage Services continuity—HA module may comprise a sub-module such as a HA Framework module (labeled "HA Framework for brevity). The Storage Features module may comprise some sub-modules such as a Volume Manager module and a Data Reduction module (respectively labeled "Volume Manager" and "Data Reduction" for brevity), where the Data Reduction module may comprise some sub-modules such as a Compression Engine module and a Deduplication Engine module, which may be respectively referred to as the Compression Engine and the Deduplication Engine. The Storage Management module may comprise some sub-modules such as a Web User Interface (UI) module, an Application Programming Interface (API) Server module, a Request Broker module and a Database module (respectively labeled "Web UI", "API Server", "Request Broker" and "Database" for brevity). The names of the modules described above indicate the associated functions thereof, respectively.

According to some embodiments, the AFA server 100 (e.g. the active node, such as one of the nodes 100A and 100B) can be configured to receive requests such as a write request, a read request, etc. from a client device outside the AFA server 100, and operate in response to the requests, respectively.

Figure 5:
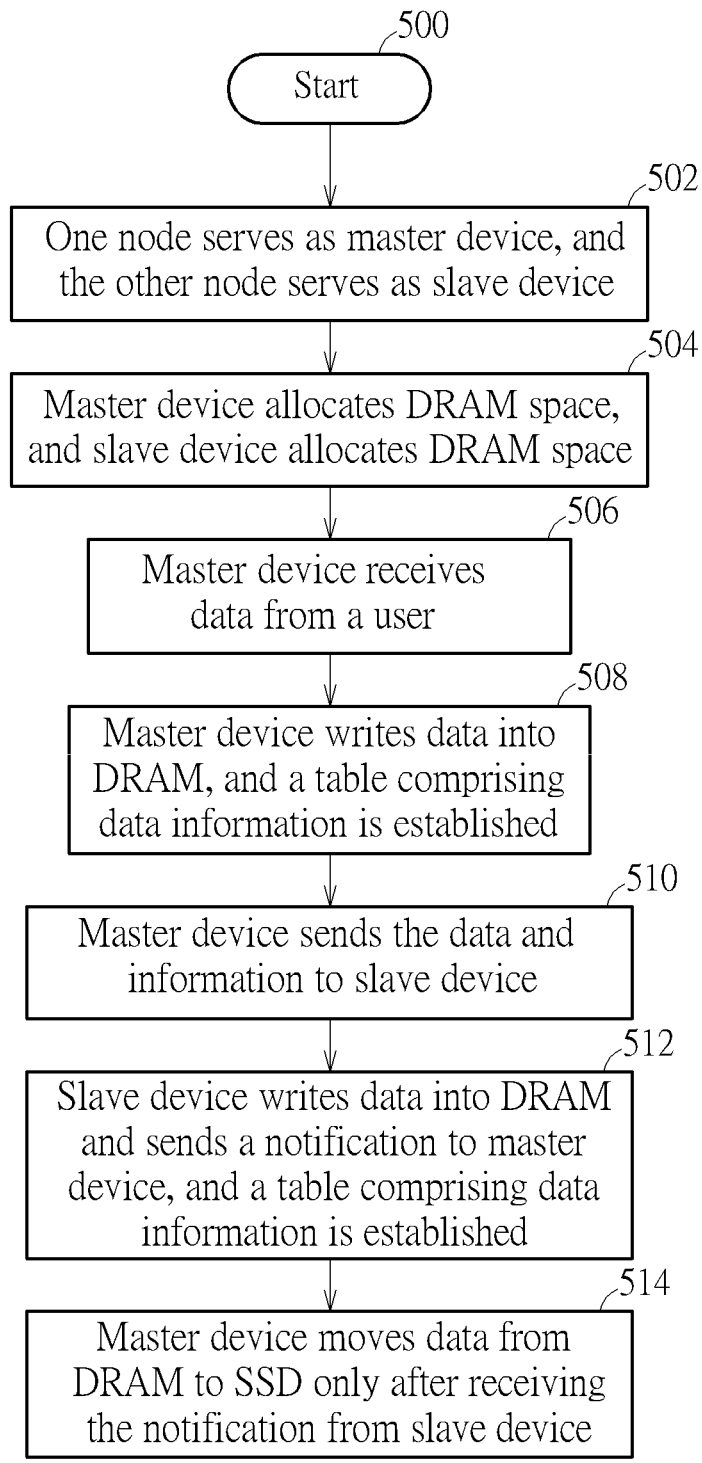
FIG. 5 is a diagram illustrating a write control scheme of the AFA server according to one embodiment of the present invention.

FIG. 5 is a diagram illustrating a write control scheme of the AFA server 100 according to one embodiment of the present invention. In Step 500, the AFA server 100 is powered on, and the AFA server 100 is able to communicate with other electronic devices via at least one network (e.g. LAN, WAN, Internet, etc.) and the TOR switches 10A and 10B. In Step 502, one node of the AFA server 100 serves as a master device while the other node serves as a slave device. In this embodiment, the node 100A serves as the master device that is capable of communicating with the other electronic devices via the TOR switches 10A and 10B and accessing the SSDs 100S, and the node 100B serves as the slave device that is not allowed to access the SSDs 100S when the node 100A works normally. In Step 504, the processor 110A allocates a DRAM space within the DRAM 120A for use of a write buffer, and the processor 110A further notifies the processor 110B of the node 100B to allocate a DRAM space within the DRAM 120B for use of a write buffer, wherein the write buffer within the DRAM 120A/120B may have any suitable size such as 16 gigabytes or 32 gigabytes. In Step 506, the node 100A receives data from a user, that is the user writes the data into the AFA server 100 via the network. In Step 508, the node 100A writes the data into the DRAM space within the DRAM 120A, and the processor 110A further establishes a table 610A shown in FIG. 6, wherein the table 610A comprises a unique ID (i.e. a user ID), a logical address of the data for the user side, a data length and a beginning address of the data in the DRAM 120A. In Step 510, the node 100A performs a cache mirroring mechanism to send the data and the corresponding information to the node 100B via the NTB, wherein the corresponding information may be at least part of the table 610A, that is the corresponding information may comprise the user ID, the logical address of the data for the user side and the data length. In Step 512, the processor 110B of the node 100B writes the data into the DRAM space within the DRAM 120B, and the processor 110B further establishes a table 610B shown in FIG. 6, wherein the table 610B comprises the user ID, the logical address of the data for the user side, the data length and a beginning address of the data in the DRAM 120B. After the data is completely written into the DRAM 120B, the processor 110B of the node 100B sends a notification to the node 100A to inform that the cache mirroring operation is complete. In Step 514, after and only after the processor 110A receives the notification from the node 100B, the node 100A sends a message to the user's electronic device via the TOR switches 10A/10B to inform that the data is successfully received, then the processor 110A starts to move the data stored in the DRAM 120A into the SSDs 100S. In one embodiment, the data stored in the DRAM 120A is moved to the SSDs 100S when the size of the data stored in the DRAM 120 and capable of being moved exceeds a predetermined value such as 64 kilobytes.

In addition, when the data stored in the DRAM 120A is moved to the SSDs 100S successfully, the processor 110A deletes the data in the DRAM 120A, and the table 610A is updated to remove the information of the data. Furthermore, the processor 110A further informs the node 100B that the data is stored in the SSDs 100S, so that the processor 110B can delete the data in the DRAM 120B, and the table 610B is updated to remove the information of the data.

Figure 6:
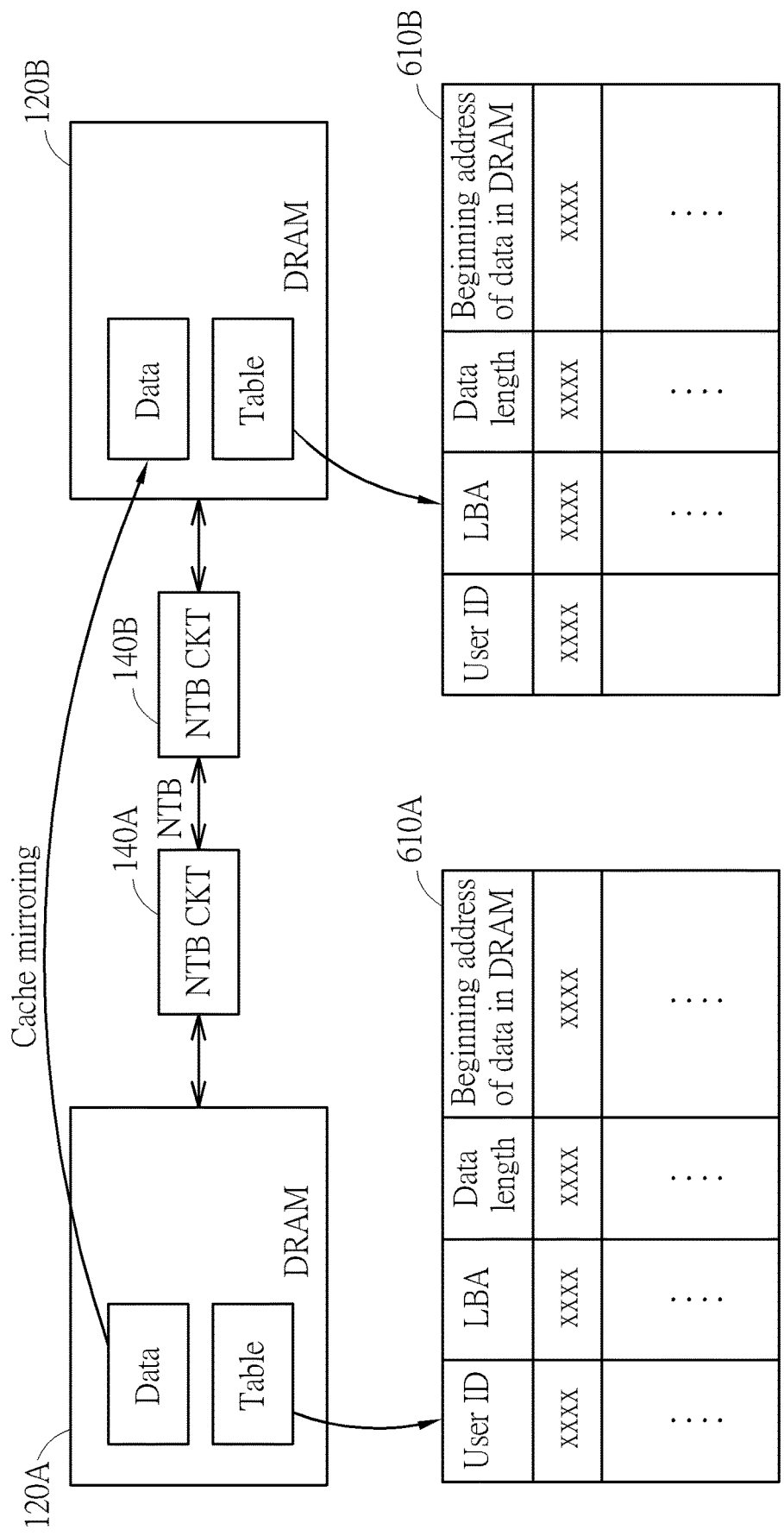
FIG. 6 shows a cache mirroring mechanism according to one embodiment of the present invention.

The cache mirroring mechanism of the above embodiment shown in FIG. 5 and FIG. 6 is used for a failover mechanism to protect the data that has been written to the DRAM 120A but not yet written to SSDs 100S. That is, once the master device stores the received data in the DRAM 120A, the master device immediately sends the data to the slave device so that both the master device and the slave device have the data. Therefore, since both the master device and the slave device have the data, once the master device fails to properly work, the slave device can immediately replace the master device to perform the operation that was supposed to be performed by the master device, that is the slave device moves the data stored in the DRAM 120B to the SSDs 100S in an appropriate time.

Figure 7:
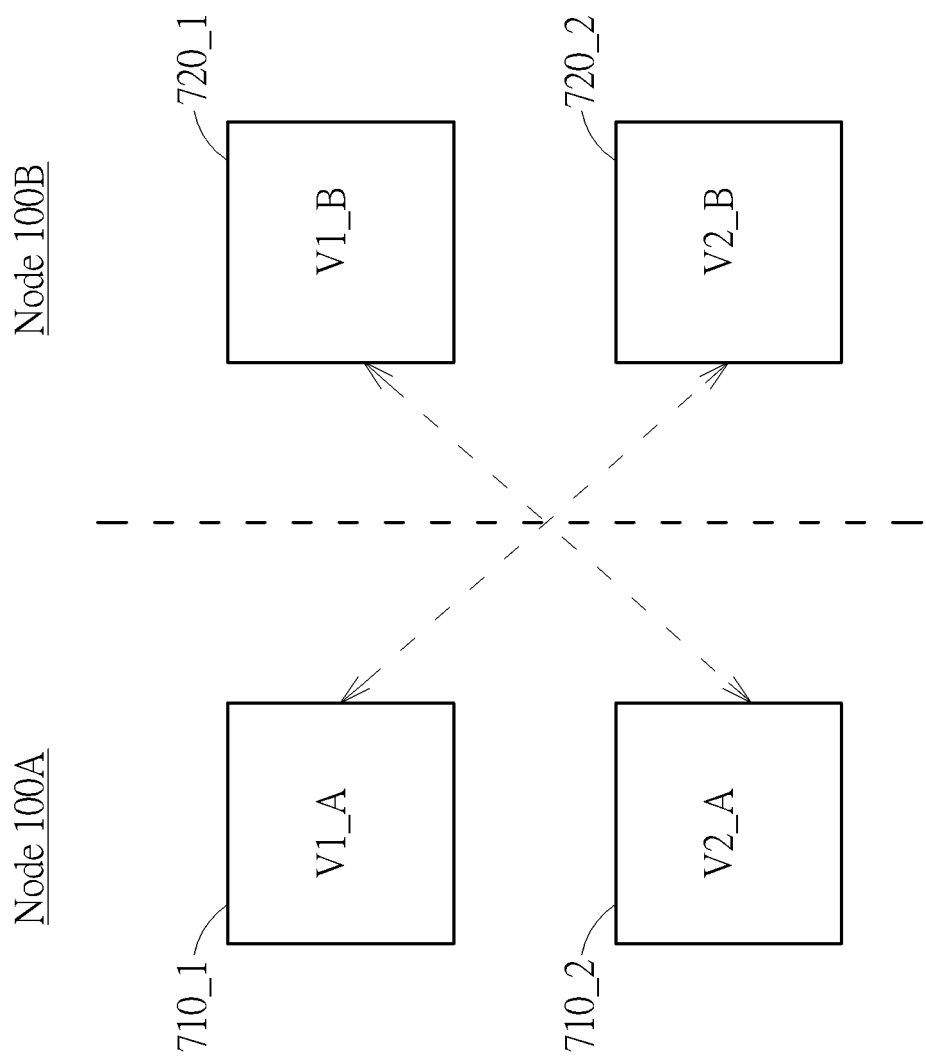
FIG. 7 shows the fault detection mechanism according to one embodiment of the present invention.

In detail, if the master device (e.g. the node 100A) suddenly fails to access the SSDs 100S, for example, the operating system of the master device crashes, memory or a storage within the master device is broken, a downstream port is disabled, or any other failure causes, the AFA server 100 can immediately execute the failover mechanism, that is the slave device (e.g. the node 100B) is configured to perform the operations of the master device. The present invention further provides a fault detection mechanism, which can effectively and accurately detect whether the master device cannot work normally. FIG. 7 shows the fault detection mechanism according to one embodiment of the present invention. As shown in FIG. 7, the node 100A assigns two registers 710_1 and 710_2, and the processor 110A of the node 100A is configured to control the registers 710_1 and 710_2 so that the register 710_1 has a value V1_A and the register 710_2 has a value V2_A. The node 100B assigns two registers 720_1 and 720_2, and the processor 110B of the node 100B is configured to control the registers 720_1 and 720_2 so that the register 720_1 has a value V1_B and the register 720_2 has a value V2_B. In one embodiment, the register 710_1 of the node 100A and the register 720_1 of the node 100B are allocated by PCIe devices, that is the register 710_1 and the register 720_1 are PCIe bar; and the register 710_2 of the node 100A and the register 720_2 of the node 100B may be allocated by the processor 110A/110B or other devices.

The register 710_1 of the node 100A and the register 720_2 of the node 100B are synchronized with each other, but the value V1_A controlled by the processor 110A is different from the value V2_B controlled by the processor 110B. In addition, the register 710_2 of the node 100A and the register 720_1 of the node 100B are synchronized with each other, but the value V2_A controlled by the processor 110A is different from the value V1_B controlled by the processor 110B. For example, assuming that the values V1_A and V2_A are '0' and '1', respectively, the processor 110A may periodically check if the values V1_A and V2_A are equal to '0' and '1', respectively. If the values V1_A and V2_A are not equal to '0' and '1', respectively, the processor 110A immediately changes the values of the registers 710_1 and 710_2 so that the value V1_A is equal to '0' and the value V2_A is equal to '1'. Similarly, assuming that the values V1_B and V2_B are '0' and '1', respectively, the processor 110B may periodically check if the values V1_B and V2_B are equal to '0' and '1', respectively. If the values V1_B and V2_B are not equal to '0' and '1', respectively, the processor 110B immediately changes the values of the registers 720_1 and 720_2 so that the value V1_B is equal to '0' and the value V2_B is equal to '1'. In light of above, when both the node 100A and the node 100B work well, the processor 110A will always determine that the values V1_A and V2_A are not equal to the predetermined values because the values V1_A and V2_A are synchronized by the values V2_B and V1_B, respectively, and the processor 110A needs to periodically update the values V1_A and V2_A to be '0' and '1', respectively. Therefore, if the processor 110A determines that the values V1_A and V2_A are always '0' and '1', it means that the node 100B does not update its values V1_B and V2_B, and the processor 110A can determine that the node 100B fails to normally work. Similarly, when both the node 100A and the node 100B work well, the processor 110B will always determine that the values V1_B and V2_B are not equal to the predetermined values because the values V1_B and V2_B are synchronized by the values V2_A and V1_A, respectively, and the processor 110B needs to periodically update the values V1_B and V2_B to be '0' and '1', respectively. Therefore, if the processor 110B determines that the values V1_B and V2_B are always '0' and '1', it means that the node 100A does not update its values V1_A and V2_A, and the processor 110B can determine that the node 100A fails to normally work.

Figure 8:
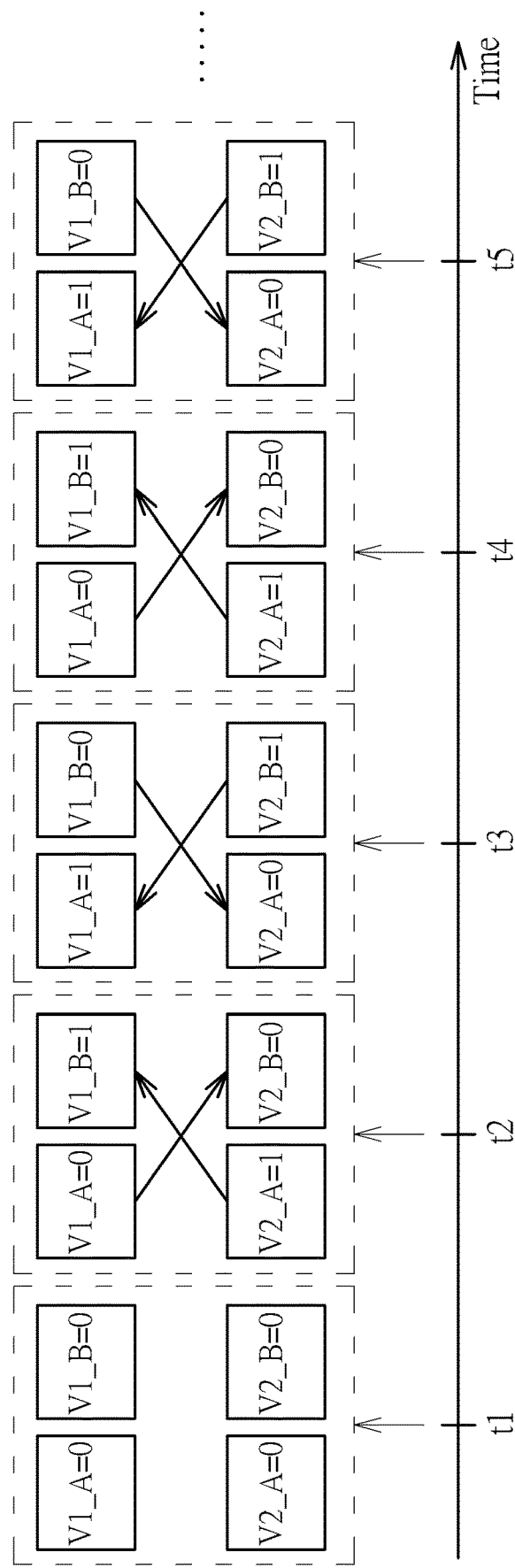
FIG. 8 shows the change of the values V1_A, V2_A, V1_B and V2_B when the both the node 100A and the node 100B work well according to one embodiment of the present invention.

FIG. 8 shows the change of the values V1_A, V2_A, V1_B and V2_B when both the node 100A and the node 100B work well according to one embodiment of the present invention. In the embodiment shown in FIG. 8, the predetermined values of the V1_A and V2_A are '0' and '1', respectively, that is the processor 110A will update the values V1_A and V2_A to be '0' and '1' if the values V1_A and V2_A are not equal to the predetermined values; and the predetermined values of the V1_B and V2_B are '0' and '1', respectively, that is the processor 110B will update the values V1_B and V2_B to be '0' and '1' if the values V1_B and V2_B are not equal to the predetermined values. As shown in FIG. 8, at time t1, the AFA server 100 is powered on, and the values V1_A, V2_A, V1_B and V2_B are equal to '0'. At time t2, the processor 110A of the node 100A checks the values V1_A and V2_A and updates the values V1_A and V2_A to be '0' and '1', respectively. Meanwhile, the values V1_B and V2_B of the node 100B are synchronized by the values V2_A and V1_A, respectively, that is the value V1_B becomes '1' and the value V2_B becomes '0'. At time t3, the processor 110B of the node 100B checks the values V1_B and V2_B and updates the values V1_B and V2_B to be '0' and '1', respectively. Meanwhile, the values V1_A and V2_A of the node 100A are synchronized by the values V2_A and V1_B, respectively, that is the value V1_A becomes '1' and the value V2_A becomes '0'. At time t4, the processor 110A of the node 100A checks the values V1_A, V2_A and updates the values V1_A and V2_A to be '0' and '1', respectively. Meanwhile, the values V1_B and V2_B of the node 100B are synchronized by the values V2_A and V1_A, respectively, that is the value V1_B becomes '1' and the value V2_B becomes '0'. At time t5, the processor 110B of the node 100B checks the values V1_B and V2_B and updates the values V1_B and V2_B to be '0' and '1', respectively. Meanwhile, the values V1_A and V2_A of the node 100A are synchronized by the values V2_A and V1_B, respectively, that is the value V1_A becomes '1' and the value V2_A becomes '0'. As mentioned above, when both the node 100A and the node 100B work well, the values in the registers 710_1, 710_2, 720_1 and 720_2 are periodically changed with the progress of the synchronization mechanism, and the processor 110A/110B also needs to periodically update its own values.

It is noted that the checking and updating steps of the processor 110A and the checking and updating steps of the processor 110B are executed in a time-interleaving manner, that is a period of the checking and updating steps of the processor 110A is the same as a period of the checking and updating steps of the processor 110B. Taking FIG. 8 as an example, an interval between the times t2 and t4 is equal to an interval between times t3 and t5 (i.e. (t4−t2)=(t5−t3)).

Figure 9:
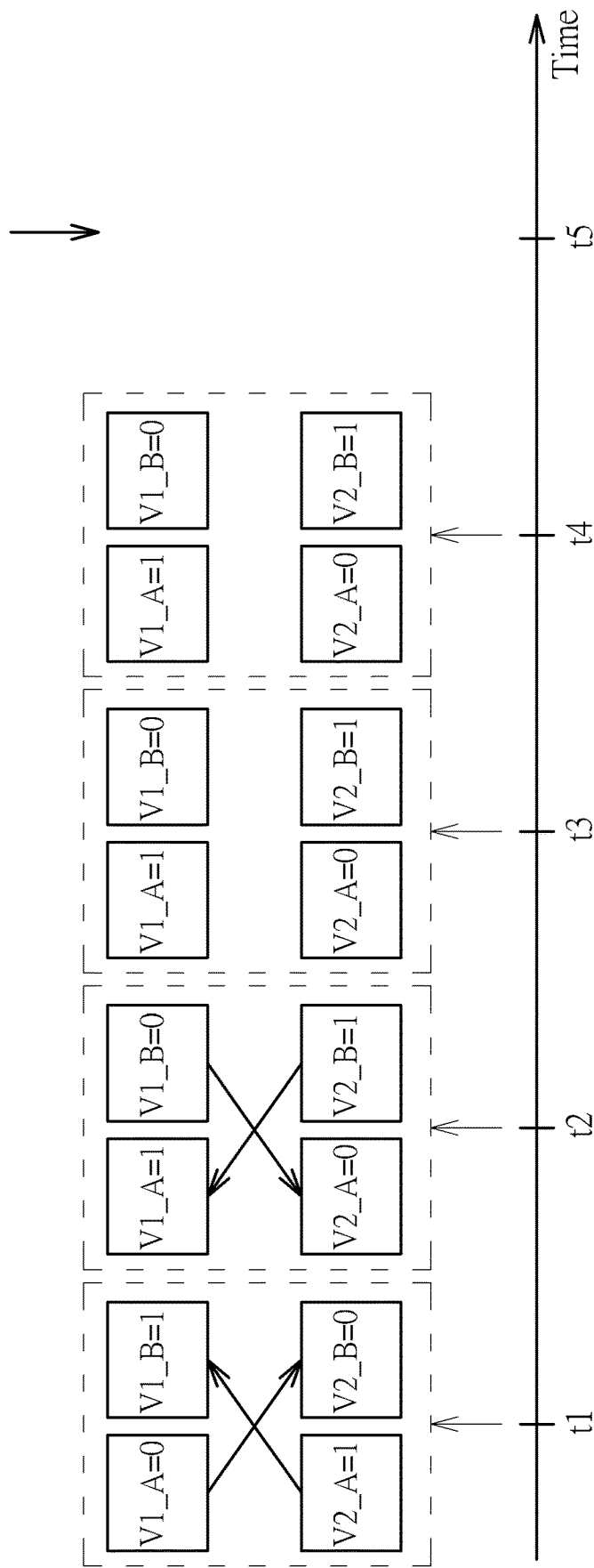
FIG. 9 shows the change of the values V1_A, V2_A, V1_B and V2_B when the node 100A fails to properly work according to one embodiment of the present invention.

FIG. 9 shows the change of the values V1_A, V2_A, V1_B and V2_B when the node 100A fails to properly work according to one embodiment of the present invention. In the embodiment shown in FIG. 9, the predetermined values of the V1_A and V2_A are '0' and '1', respectively, that is the processor 110A will update the values V1_A and V2_A to be '0' and '1' if the values V1_A and V2_A are not equal to the predetermined values; and the predetermined values of the V1_B and V2_B are '0' and '1', respectively, that is the processor 110B will update the values V1_B and V2_B to be '0' and '1' if the values V1_B and V2_B are not equal to the predetermined values. As shown in FIG. 9, at time t1, the processor 110A of the node 100A checks the values V1_A and V2_A and updates the values V1_A and V2_A to be '0' and '1', respectively. Meanwhile, the values V1_B and V2_B of the node 100B are synchronized by the values V2_A and V1_A, respectively, that is the value V1_B becomes '1' and the value V2_B becomes '0'. At time t2, the processor 110B of the node 100B checks the values V1_B and V2_B and updates the values V1_B and V2_B to be '0' and '1', respectively. Meanwhile, the values V1_A and V2_A of the node 100A are synchronized by the values V2_A and V1_B, respectively, that is the value V1_A becomes '1' and the value V2_A becomes '0'. At time t3, the node 100A suddenly fails to properly work and the processor 110A does not update the values V1_A and V2_A, that is the values V1_A and V2_A are still '1' and '0', respectively. At time t4, the processor 110B of the node 100B checks the values V1_B and V2_B and finds that the values V1_B and V2_B do not need to be updated, so the processor 110B determines that the node 100A (master device) fails to work, and the node 100B (slave device) can execute the failover mechanism to perform the operations that was supposed to be performed by the node 100A.

In light of above, because the node 100A/100B can determine if the other node fails to work by checking its own registers only, without referring to the notification from the other node, the fault detection mechanism of the embodiment can effectively and accurately detect whether the other node cannot work normally.

In one embodiment, when the failover mechanism is executed, the node 100B will become the master device from the slave device. Therefore, the predetermined values of the V1_A and V2_A within the node 100A are preferred to be the same as the predetermined values of the V1_B and V2_B within the node 100B, for the convenience to the software design. However, the present invention is not limited to this setting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A server, comprising:
   a solid state drive (SSD);
   a first node, comprising:
      a first memory, comprising a first register and a second register;
      a first processor, configured to control the first register and the second register to have a first value and a second value, respectively; and
      a first communication circuit, coupled to the first processor and the first memory; and
   a second node, comprising:
      a second memory, comprising a third register and a fourth register;
      a second processor, configured to control the third register and the fourth register to have a third value and a fourth value, respectively; and
      a second communication circuit, coupled to the second processor, the second memory and the first communication circuit;
   wherein the first register and the fourth register are synchronized with each other, the second register and the third register are synchronized with each other, the first value controlled by the first processor is different from the fourth value controlled by the second processor, and the second value controlled by the first processor is different from the third value controlled by the second processor.

2. The server of claim 1, wherein the second processor checks if the third register has the third value and the fourth register has the fourth value; and if the third register does not have the third value and the fourth register does not have the fourth value, the second processor determines that the first node works well, and the second processor controls the third register and the fourth register to have the third value and the fourth value, respectively; and if the third register has the third value and the fourth register has the fourth value, the second processor determines that the first node fails to work.

3. The server of claim 2, wherein if the first node is configured to access the SSD, and the second node serves as a slave device that does not access the SSD, and the second processor determines that the first node fails to work, the second node enables a failover mechanism to perform operations that are supposed to be performed by the first node.

4. The server of claim 2, wherein the first processor checks if the first register has the first value and the second register has the second value; and if the first register does not have the first value and the second register does not have the second value, the first processor determines that the second node works well, and the first processor controls the first register and the second register to have the first value and the second value, respectively; and if the first register has the first value and the second register has the second value, the first processor determines that the second node fails to work.

5. The server of claim 1, wherein the first value and the third value are the same, and the second value and the fourth value are the same.

6. The server of claim 1, wherein the first register is assigned by a Peripheral Component Interconnect Express (PCIe) device of the first node, and third register is assigned by a PCIe device of the second node.

7. A control method of a server, comprising:
   setting a first node within the server as a master device;
   periodically controlling a first register and a second register of the first node to have a first value and a second value, respectively;
   setting a second node within the server as a slave device;
   periodically controlling a third register and a fourth register of the second node to have a third value and a fourth value, respectively;
   controlling the first register and the fourth register to synchronize with each other, wherein the first value controlled by the first node is different from the fourth value controlled by the second node;
   controlling the second register and the third register to synchronize with each other, wherein the second value controlled by the first node is different from the third value controlled by the second node.

8. The control method of claim 7, further comprising:
   checking if the third register has the third value and the fourth register has the fourth value;
   if the third register does not have the third value and the fourth register does not have the fourth value, determining that the first node works well, and controlling the third register and the fourth register to have the third value and the fourth value, respectively; and
   if the third register has the third value and the fourth register has the fourth value, determining that the first node fails to work.

9. The control method of claim 8, wherein the first node is configured to access the SSD, and the second node is not allowed to access the SSD, and the control method further comprises:
   if it is determined that the first node fails to work, enabling a failover mechanism to make the second node perform operations that are supposed to be performed by the first node.

10. The control method of claim 8, further comprising:
    checking if the first register has the first value and the second register has the second value;
    if the first register does not have the first value and the second register does not have the second value, determining that the second node works well, and controlling the first register and the second register to have the first value and the second value, respectively; and
    if the first register has the first value and the second register has the second value, determining that the second node fails to work.

11. The control method of claim 7, wherein the first value and the third value are the same, and the second value and the fourth value are the same.

12. The control method of claim 7, wherein the first register is assigned by a Peripheral Component Interconnect Express (PCIe) device of the first node, and third register is assigned by a PCIe device of the second node.

* * * * *